United States Patent [19]

Suzuki et al.

[11] Patent Number: 4,744,039
[45] Date of Patent: May 10, 1988

[54] ROBOT WITH SELF TEACHING OF A LINEAR REFERENCE POSITION

[75] Inventors: Hayao Suzuki; Yoshiharu Matsuoka, both of Tokyo, Japan

[73] Assignee: Seiko Instruments & Electronics Ltd., Tokyo, Japan

[21] Appl. No.: 758,046

[22] Filed: Jul. 23, 1985

[30] Foreign Application Priority Data

Jul. 23, 1984 [JP] Japan .................. 59-152560

[51] Int. Cl.$^4$ .............................................. G06F 15/00
[52] U.S. Cl. ................................... 364/513; 364/474; 901/47
[58] Field of Search ............... 364/513, 474, 475, 559; 318/568; 901/47; 29/720, 721

[56] References Cited

U.S. PATENT DOCUMENTS

| | | | |
|---|---|---|---|
| 4,380,696 | 4/1983 | Masaki | 364/513 |
| 4,456,961 | 6/1984 | Price | 364/513 |
| 4,495,588 | 1/1985 | Nio | 364/513 |
| 4,542,467 | 9/1985 | McMurtry | 364/474 |
| 4,558,424 | 12/1985 | Oguchi | 364/513 |
| 4,562,551 | 12/1985 | Inaba | 364/513 |
| 4,583,159 | 4/1986 | Kanemoto | 364/474 |
| 4,613,942 | 9/1986 | Chen | 364/513 |
| 4,613,943 | 9/1986 | Miyake | 364/513 |

Primary Examiner—Jerry Smith
Assistant Examiner—Allen MacDonald
Attorney, Agent, or Firm—Bruce L. Adams; Van C. Wilks

[57] ABSTRACT

A robot control system has a robot hand movable along a plane according to position data determined in terms of an absolute coordinate system related to the plane for acting on a workpiece which is arbitrarily positioned on the plane and which is provided with a linear reference pattern. The robot hand is swept along a predetermined locus on the plane according to programmed position data to determine the position of the workpiece. A detector mounted on the hand moves relative to the plane together with the hand for detecting the linear reference pattern whenever the hand crosses the linear reference pattern during the sweep movement of the hand to produce a corresponding detection signal. A read circuit operates in response to the detection signal for reading position data representative of a plurality of crossing points between the locus and the linear reference pattern in terms of the absolute coordinate system, and a processor processes the read position data to determine a position of the workpiece relative to the plane.

7 Claims, 3 Drawing Sheets

ROBOT WITH SELF TEACHING OF A LINEAR REFERENCE POSITION

BACKGROUND OF THE INVENTION

This invention relates to a highly operational robot for general purpose which is driven by a servomotor, a servovalve and others and provided with a plurality of moving shafts operating as controlled by a controller, and is particularly concerned with a controlling system applicable for the robot developed to exercise a great performance for labor saving, rationalization of working and other purposes.

In a conventional robot, there still remain various problems to be settled in the aspect of controlling system, and it can hardly be said that the highly operational robot for general purpose in mechanism is on its full performance.

SUMMARY OF THE INVENTION

This invention is to provide a controlling system effective enough to reform the existing circumstances.

An object of this invention is to reduce the cost for a robot system by simplifying peripheral equipments at the time of operating a robot.

Another object of the invention is to simplify a teaching work in the robot system.

A further object is to decrease a number of teaching points.

In a robot requiring a high positioning precision like an assembly robot, a work for teaching an operating position is very difficult and takes a long time.

On the other hand, there is such a member to be assembled as is exceedingly precise in a multitude of working points so far as a content of the member is concerned like a printed circuit board, for example, therefore a numerical command will be preferable to a teaching work in this case. However, it is most difficult to adjust the origin of a robot arm to the installation standard of a robot within a necessary positioning precision so as to reduce a difference between robots.

Further, it is also difficult to adjust positions of members disposed in the periphery of robots such as a table of a robot system for supporting the robot or loading and unloading devices of the pallet and the like or a substrate member for being assembled, all within a necessary positioning precision relative to the robot arm.

Furthermore, for handling the workpiece placed roughly in position at high precision, a prevailing method is such that the work position is read at high precision by TV camera or the like to operate a robot. Such a method is defective to involve an exceedingly high cost.

As described, there are left so many problems yet for teaching method and position detecting method for the work handling.

Now, in this invention, coordinates within a member fabricated at high precision like a printed circuit board and a direction of workpieces to be assembled therein are previously prepared by inputting numerical values representing coordinates in a local orthogonal coordinate system of the printed circuit board and representing the direction of a gripper necessary for assembling the workpiece relative to a reference axis of the coordinate system or by a method of off-line indication and others.

With a reference point of the circuit board coordinate system ready for automatic detection on a simple hardware, data on coordinates whereat a robot is to operate and direction of a hand will be created automatically.

BRIEF DESCRIPTION OF THE DRAWINGS

The drawings represent embodiments of this invention, wherein.

DETAILED DESCRIPTION OF THE INVENTION

This invention will now be described with reference to the drawings.

Figure 1:
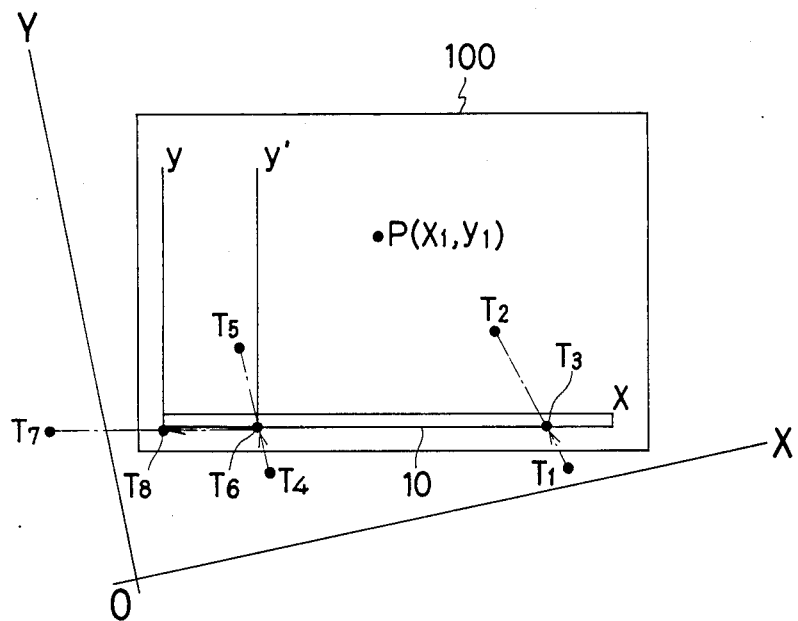
FIG. 1 is an explanatory view representing a technique for obtaining a local coordinate system of a printed circuit substrate placed in a robot absolute coordinate system (XY)

FIG. 1 represents a printed circuit board 100 placed in a robot absolute coordinate system (XY). The printed circuit board 100 has a printed circuit pattern arranged at high precision depending on a manufacturing process, but an outline is not arranged so precise as the circuit pattern. Accordingly, in the case of a robot system for mounting parts on a such a printed circuit board, a positioning hole perforated at high precision through the circuit pattern is generally prepared, and a pin for precisely guiding the hole is provided on a robot system.

However, in such a system, a position of the pin must be changed as the printed circuit board to be mounted is changed, and therefore such a system is inconvenient, lacks in a flexibility and also requires a high cost.

For the printed circuit board shown in FIG. 1, this invention is effective to realize a system wherein parts can be mounted by utilizing a simple sensor, as described next, despite a rough positioning of the printed circuit board.

In FIG. 1, a linear reference circuit pattern 10 formed thick in the board 100 is utilized as a reference of the printed circuit board 100. A detector 1 (shown in FIG. 4) is installed in a hand, and is capable of detecting the reference circuit pattern 10. An optical detector, a contactless switch detector utilizing magnetic induction and others may be used for the detector 1, however, no description will particularly be necessary. First, the hand is driven to move along a linear locus from a point T, to point $T_2$ according to a program in a mode wherein the hand stops at a crossing point $T_3$ on a reference pattern 10 when a detection signal is fed from the detector 1. If the pattern detection signal is not produced until the hand reaches the point $T_2$, then it indicates an abnormal state where the printed circuit board 100 is not present and so forth, and a proper measure will be programmed accordingly. After the hand stops at the point $T_3$, coordinates of $T_3$ are lead out or self-taught in terms of the absolute coordinate system (XY) by the program and stored in a memory. The hand can easily be stopped by a robot controller when a detection signal input is received during the sweeping movement by employing an integrated circuit for CPU, I/O port or the like manufactured through a prevailing LSI technique, and a more detailed description will be given hereinafter.

Then, as for self-teaching, it is a matter of course that the robot controller stores a current position of the hand at all times, which can be stored in a position memory through a general technique.

The hand is then moved from a point $T_4$ to $T_5$ by the program exactly in the same way as above-mentioned across the reference pattern, and stopped at a crossing point $T_6$ on the reference pattern 10, and the point $T_6$ is self-taught.

Next, with the self-taught point $T_6$ as an origin and the point $T_3$ as one point on x-axis, a temporary local orthogonal coordinate system xy' is defined in the plane where the printed circuit board 100 is placed.

Further, in the temporary local orthogonal coordinate system xy', the hand is moved linearly from the coordinates (0, 0) of $T_6$ toward a point $T_7$ having coordinates $(-x_7, 0)$ where the pattern is not present apparently by the program in a mode wherein the hand comes to stop when the pattern detection signal from the detector 1 is inputted, at an end point $T_8$ on the pattern 10, and coordinates of $T_8$ are self-taught. With the self-taught point $T_8$ as an origin and the self-taught point $T_3$ or the point $T_6$ as one point on x-axis, a new local orthogonal coordinate system xy is defined. The new local orthogonal coordinate system xy is intrinsic to the printed circuit board 100 in the state, which becomes a printed circuit board coordinate system for a previously given numerical value or a coordinate value through off-line teaching.

Assuming the coordinates of the origin $T_8$ and $T_3$ (or $T_6$) on the absolute XY coordinate system are $(X_0, Y_0)$ $(X_1, X_1)$ respectively, a working point P $(x_1, y_1)$ on the printed circuit board local coordinate system obtained as above will be converted into a operating point (X, Y) on the robot absolute coordinate system XY according to the following expression:

$$\begin{vmatrix} X - X_0 \\ Y - Y_0 \end{vmatrix} = \begin{vmatrix} \cos(-\theta), \sin(-\theta) \\ -\sin(-\theta), \cos(-\theta) \end{vmatrix} \begin{vmatrix} x_1 \\ y_1 \end{vmatrix} \quad (1)$$

$$\text{where } \cos\theta = \frac{X_1 - X_0}{\sqrt{(X_1 - X_0)^2 + (Y_1 - Y_0)^2}}$$

$$\sin\theta = \frac{Y_1 - Y_0}{\sqrt{(X_1 - X_0)^2 + (Y_1 - Y_0)^2}}$$

An angle of the local coordinate system is relative to the absolute coordinate system determined by the angle $\theta$ of the expression (1), and a direction of the hand can be corrected by $\theta$ for operation.

As described, a working point on the printed circuit board and an angle of the hand are converted precisely as operating points on the robot absolute coordinate system by a simple sensor, and thus the robot can be operated on the working points without a precise positioning means or a complicated position teaching work.

By the way, the above coordinate conversion is carried out by the linear movement for detecting $T_8$ from the point $T_6$.

Another embodiment of this invention will be described further.

Figure 2:
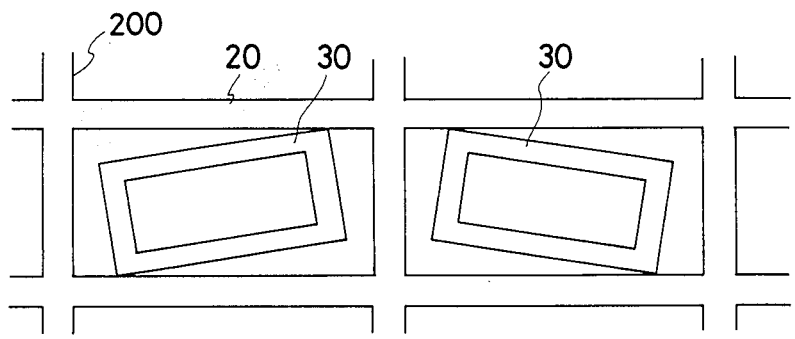
FIG. 2 is an explanatory view representing workpieces in partitions of a pallet as another embodiment.

FIG. 2 is an illustration wherein a work or workpiece 30 is placed in a partition 20 of a pallet 200. The work 30 is not precisely placed in position in the partition 20 and hence is free to move.

In a conventional robot system, the work 30 cannot be grasped in the pallet 200 unless it is placed correctly in position. The pallet 200 must be prepared precisely at every work 30, and a cost becomes high per pallet. The pallet is required for every kinds of the work, and a process for placing the work in the pallet is also required, and thus the cost becomes very high.

In this embodiment, there is provided a system for controlling the robot to detect a position of the work correctly to grasp the work by a simple sensor installed in the hand. A common pallet which is inexpensive like a carrying box is used for various works, and is suitable for placing the work roughly in position in the partition.

Figure 3:
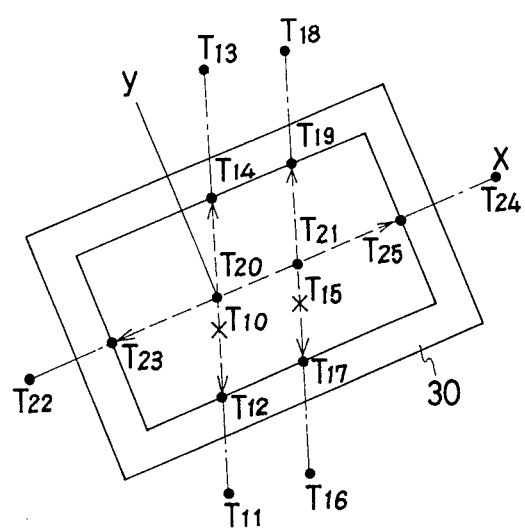
FIG. 3 is an explanatory view representing a technique for obtaining positions of the workpieces placed in the partitions of FIG. 2.

FIG. 3 represents a method for detecting correctly a linear position and an angular position of the work in the partition shown in FIG. 2.

First, for detection of a reference edge of the work 30, the hands are moved in a mode where they stop upon detection of the reference edges of the work. The hands move in parallel from points $T_{10}$, $T_{15}$ which are assumed to be centers of the work 30 toward points $T_{11}$, $T_{13}$, $T_{16}$, $T_{18}$ on both sides, and the detected stop points $T_{12}$, $T_{14}$, $T_{17}$, $T_{19}$ are self-taught by the program as in the above-mentioned case. Next, a midpoint $T_{20}$ of $T_{12}$, $T_{14}$ and a midpoint $T_{21}$ of $T_{17}$, $T_{19}$ are obtained through arithmetic operation. With $T_{20}$ as an origin and $T_{21}$ as one point which determines an x-axis, the local orthogonal coordinate system xy is defined. For reference edge detection of the work 30 during the sweep movement of the hands between points $T_{22}$, $T_{24}$ which are points on x-axis in the local orthogonal coordinate system xy and also assumed to lie apparently outside the work, the hands are moved in the mode where they stop upon detection of the reference edges of the work, and the detected stop points $T_{23}$, $T_{25}$ are self-taught.

A midpoint of $T_{23}$, $T_{25}$ is a center of the work, an angular position of the work is calculated according to the angle of a segment between $T_{23}$, $T_{25}$ relative to the absolute coordinate system, and thus, depending on these two data, the robot is capable of grasping the work 30 correctly with its hands.

With $T_{12}$, $T_{14}$, $T_{17}$, $T_{19}$ given in vector, the above midpoints $T_{20}$ and $T_{21}$ can be calculated as:

$$T_{20} = (T_{12} + T_{14})/2$$

$$T_{21} = (T_{17} + T_{19})/2$$

In the above description of the embodiments of this invention, it is generally unusual that the detector and the gripper installed in the hand can be installed on the same point in a plane, and, in most cases, they can be installed only on different portions.

Under the above-mentioned conditions, for detecting the work 30 by the detector and gripping according to a detected result, a positional relation in space between the detector and the grip (concretely an angle of a line connecting the detector and the grip to space and the distance) must be constant. Then, a posture of the hand will be kept constant therefor. Insofar as the posture in a horizontal plane is concerned, there is nothing problematical with the orthogonal coordinate type control. In a robot of cylindrical coordinate type or horizontal articulated type, an operating axis for rotating the hand in a horizontal plane is provided, and then it is controlled so that the sum of horizontal turning angles of the operating axis will be kept zero at all times.

In the above arrangement, a displacement in space between the detector and the gripper is expressed by a constant vector, and the local orthogonal coordinate system detected by the detector is shifted by the vector, thereby defining the local orthogonal coordinate system for the gripper.

Further, in the description of these embodiments, the detector has been installed at a center of the hand. If it is not installed at the center of the hand, the posture of the hand is turned by the angle at which the local coordinate system is inclined relative to the robot absolute coordinate system at the time of detecting operation, therefore the vector of the detector to the center of the hand will be changed in the local coordinate system and in the process for detecting $T_8$ in FIG. 1, the detector 1 will be dislocated from the pattern.

In this case, the local coordinate system is re-detected by the inclination of the local coordinate system by means of the turned hand posture. An inclination of the re-detected local coordinate system will be the same as before, and the origin will be displaced by the difference of the vector which is obtained by turning hand posture. Thus in the re-detected local coordinate system, the posture of the hand is intrinsic to the reference axis of the coordinate system. Therefore the gripper will be positioned at each working positions by adding the vector of the gripper's center to the detector which is intrinsic in the local coordinate system.

The above description refers to an example whether the coordinate value in the local coordinate system is subjected to a numerical input control or an off-line teaching such as in the case of the printed circuit board, however, the local coordinate system can be defined according to an on-line teaching and taught as coordinates of the local coordinate system, which is realizable through an inversion of the expression (1).

According to the expression (1), it is possible that the coordinates of the local coordinate system taught as above will be specified as the same coordinates on another local coordinate system for an operation of the robot and accordingly, the same operation may be carried out in a different area of the same robot system under the same taught data and numerical data.

Further, it is also possible that the teaching data used in one robot system will be applied as working data for other robot systems.

Then, many techniques to define the pallet are proposed. And in the case of this description, a center in one partition of the pallet is also expressed by vector, and if movement command vectors $T_{10}$, $T_{11}$, $T_{13}$, $T_{15}$, $T_{16}$, $T_{18}$ in the description are specified in the form of adding to the above-mentioned vector, then the movement command vectors can be used in common to all partitions of the pallets, and thus the program can be executed very simply.

Figure 4:
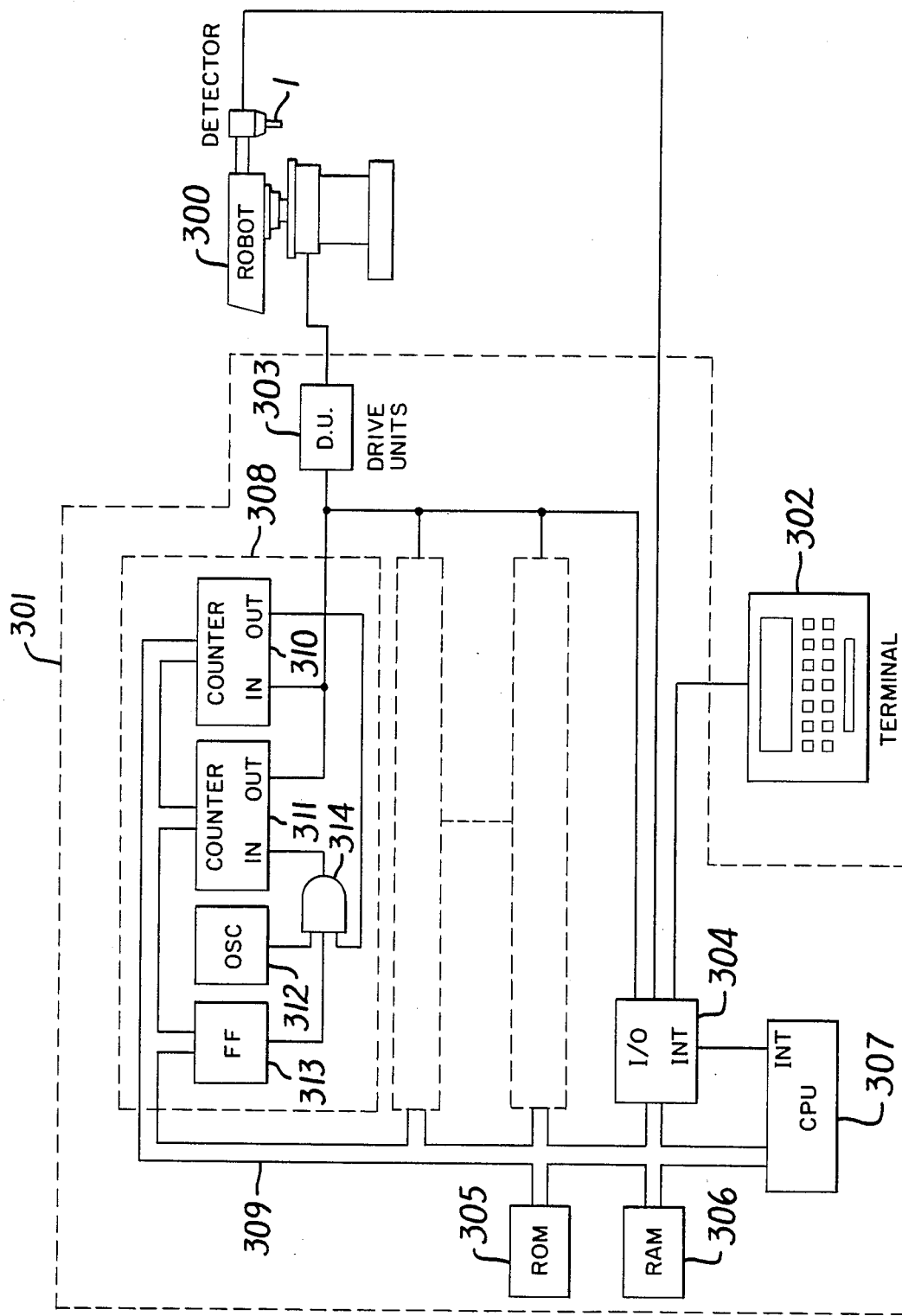
FIG. 4 is a block diagram of an embodiment of a control system for executing the control of embodiments of the present invention.

An embodiment of the control system for controlling an embodiment of the present invention as above-mentioned, is shown in a block diagram of FIG. 4.

This control system comprises a controller 301 which controls the robot 300 having plural operating shafts and a terminal 302 which is provided with a key board and a display device to program the operating sequence of the robot and keys which conducts jogging of the robot so that the controller 301 can teach the operating position of the robot.

The controller 301 comprises: a plurality of drive units 303 which control the driving source such as a motor and the like (not shown) so as to drive a plurality of operating shafts of the robot; an input and output control portion (I/O) 304 which is operable to execute sending and/or receiving of an input signal from the terminal 302 and of an output signal displayed in the terminal, sending and/or receiving of an output signal of the operation shaft of the robot 300 and of a control signal for detecting the over-load of the motor and the like which are respectively applied to the drive units, sending and/or receiving of movement signal of the hand, receiving of the robot condition signal which is provided with a function that, when the designated polarity of the CPU 307 is applied thereto, the interruption input INT will occur in the CPU 307 which is composed of the LSI and the like for controlling input and output of the micro-computor; the CPU 307 which is operable to execute processing the signal from the input-output control portion 304, controlling reading-out and/or storing of the data between the memory device composed of a RAM 305 and a ROM 306, and operating the coordinate operation and/or logical operation of the robot; the RAM 306 which memorizes such data as the program data processed by the CPU 307, or robot operating position data, in accordance with the program signal from the terminal 302; the ROM 305 which memorizes the procedure for executing each of the commands of the program data stored in the RAM 306; and a plurality of movement control circuits 308 for outputting a movement command pulse to the drive unit 303.

In the movement control circuit 308, the movement pulse number is set on the counter 310 and the cycle of the movement pulse command pulses that is in inverse-proportion to the movement speed, is set on the counter 311. Both of them are set from CPU 307 through the bus 309. In the counter 310, reduction counting is executed when the pulse is applied to the input terminal IN, and when the content becomes zero, the output terminal OUT becomes low level. In the counter 311, the quotient obtained by dividing the input pulse number with the set number, becomes the output pulse number. Besides, the counter 310 is also a kind of a peripheral LSI for micro-computers whose content can be outputted to the bus 309. An oscillator 312 is an oscillator with a certain frequency and a flip-flop 312 is controlled in accordance with commands from the computer 307.

After the movement amount and the pulse cycle are set as above mentioned, when the flip-flop 313 is switched on by the CPU 307, the pulse with the certain frequency generates from the AND gate 314, and is applied to the counter 311, and the output of the counter 311 that is a pulse with same cycle as the set one, is applied to the input of the drive unit 303 and the input of counter 310.

When the counter 310 counts just the set movement amount, the output thereof becomes low-level, and closes the AND gate 314 and the pulse output applied to the drive unit 303 stops.

Accordingly, it can output the pulses to the drive unit 303, the pulses having the pulse number commanded by the CPU 307 and the frequency commanded by the CPU 307.

In a control system as set forth above, an input signal from the detector 1 is applied to the I/O 304 as in the other input means. Accordingly, in a mode that the movement of the hand stops when the detected signal reaches its designated level while the hand is on its way toward a target position in accordance with the movement command, when an output of the detector 1 reaches the designated level while the movement control circuit 308 outputs an output pulse, the interruption immediately occurs from I/O 304 to CPU 307.

At this time, if the designated input of the detector is plural, other conditions are also checked by the logic operation function. Consequently, if conditions for stopping are satisfied, the CPU 307 causes the flip-flop 313 to close immediately and applies the command pulses to the drive unit 303 to stop the hands.

At this time, the content of the counter 310 is not zero, but the data of the pulses which corresponds to the difference between the present position and the target position, is remained.

This data can be applied from the counter 310 to the CPU 307 through the bus 309 as mentioned above, and by reducing the distance corresponding to this data from the target value, the present position can be calculated.

Therefore, the present position of the operation shaft of the robot is normally readable through the CPU 307 and the present position can be replaced with the next operation position of the robot.

This self-teaching function is a fundamental function of the CPU 307 and is executed by replacing the data of the RAM 306.

If the designated signal level is not detected even when the hand reaches to the target position, the hand can be switched to another designated operation by the logic discriminating function and the jumping function of CPU 307.

It goes without saying that the coordinate conversion and the controlling of hand positive and the like are executed by the numerical calculating function of one of the fundamental function of the CPU 307.

As described above, according to the robot controlling system of this invention, a high precision working is ensured by using a simple sensor in connection with a work locating member such as a pallet and others which are not so high in precision, inexpensive and available for common use on various kinds of works unlike those which require a high precision working and must be prepared in accordance with the kinds of the works hitherto, and further the complicated teaching word is extremely facilitated, thus the economical and technical effects are extremely enhanced.

What we claim is:

1. In a robot control system having a robot hand movable along a plane according to position data determined in terms of an absolute coordinate system related to the plane for acting on a workpiece which is arbitrarily positioned on the plane and which is provided with a linear reference pattern: sweeping means for sweeping the hand along a predetermined locus on the plane according to programmed position data; detecting means mounted on the hand for movement therewith relative to the plane for detecting the linear reference pattern whenever the hand crosses the linear reference pattern during the sweep movement of the hand to produce a corresponding detection signal; reading means operative in response to the detection signal for reading from the sweeping means position data representative of a plurality of crossing points between the locus and the linear reference pattern in terms of the absolute coordinate system; and processing means for processing the read position data to determine a position of the workpiece relative to the plane.

2. A robot control system according to claim 1; wherein the processing means includes calculating means for calculating an angular position of the workpiece according to the read position data representative of a pair of crossing points on the same linear reference pattern.

3. A robot control system according to claim 1; wherein the processing means includes calculating means for calculating a linear position of the workpiece according to the read position data representative of a plurality of crossing points on different linear reference patterns which intersect with each other.

4. A robot control system according to claim 3; wherein the calculating means includes means for calculating a center position of the workpiece according to the read position of the workpiece according to the read position data representative of a plurality of crossing points on different linear reference patterns arranged to define a rectangular shape, the center of which corresponds to the center position of the workpiece.

5. A robot control system according to claim 1; including inputting means for inputting working point data in terms of local coordinate system having an origin and an axis related to the linear reference pattern; determining means for determining the position of the origin and the axis in terms of the absolute coordinate system according to the read position data; and transforming means for transforming the input working point data in terms of the local coordinate system to corresponding position data in terms of the absolute coordinate system based on the determined position of the origin and the axis in terms of the absolute coordinate system.

6. A robot control system according to claim 5; wherein the local coordinate system comprises an orthogonal coordinate system having an axis aligned along the linear reference pattern and an origin positioned at the end of the linear reference pattern.

7. A robot control system according to claim 6; wherein the determining means comprises first determining means for determining the position of the axis based directly on the read position data, and second determining means operative to control the sweeping means to move the hand together with the detecting means along the linear reference pattern to thereby detect the end of the linear reference pattern for determining the position of the origin.

* * * * *